United States Patent [19]

Newman

[11] Patent Number: 4,965,788
[45] Date of Patent: Oct. 23, 1990

[54] SELF-ROUTING SWITCH ELEMENT FOR AN ASYNCHRONOUS TIME SWITCH

[75] Inventor: Peter Newman, Cambridge, England

[73] Assignee: Network Equipment Technologies, Inc., Redwood City, Calif.

[21] Appl. No.: 258,291

[22] Filed: Oct. 14, 1988

[30] Foreign Application Priority Data

Oct. 15, 1987 [GB] United Kingdom ................ 8724208

[51] Int. Cl.$^5$ .......................... H04Q 11/04; H04J 3/24
[52] U.S. Cl. ...................................... 370/60; 370/94.1
[58] Field of Search ....................... 370/60, 94, 85, 60, 370/60.1, 85.1, 94.1

[56] References Cited

U.S. PATENT DOCUMENTS

| | | | |
|---|---|---|---|
| 4,482,996 | 11/1984 | Wilson et al. | 370/60 |
| 4,488,151 | 12/1984 | Bolton et al. | 370/85 |
| 4,621,359 | 11/1986 | McMillen | 370/94 |
| 4,630,260 | 12/1986 | Toy et al. | 370/94 |
| 4,661,947 | 4/1987 | Lea et al. | 370/94 |
| 4,707,831 | 11/1987 | Weir et al. | 370/94 |
| 4,731,878 | 3/1988 | Vaidya | 370/60 |
| 4,734,907 | 3/1988 | Turner | 370/94 |
| 4,764,919 | 8/1988 | Hunter et al. | 370/60 |

FOREIGN PATENT DOCUMENTS 2151880 7/1985 United Kingdom .

OTHER PUBLICATIONS

Milway, D. R. "Binary Routing Networks", U. of Cambridge Computer Lab., Tech. Report No. 101, Cambridge, England Dec. 1986, (entire document).

Primary Examiner—Douglas W. Olms
Assistant Examiner—Alpus H. Hsu
Attorney, Agent, or Firm—Fliesler, Dubb, Meyer & Lovejoy

[57] ABSTRACT

The switching element (16) comprises a plurality of selectors (32) each having an input for a tagged packet signal and a plurality of arbiters (34) each having an output for a transmitted packet signal. Between each selector (32) and each arbiter (34) is a signal path connection. Each arbiter (34) selects the first received packet signal and prohibits transmission from all other selectors by assertion of a busy signal until transmission of the first received packet signal is completed. An asynchronous time switch having a switching fabric made up of such elements (16) copes with the maximum delay requirements of voice class signals by priority of selection over other classes of signals. Increased throughput is attained by means of multiple switch fabric planes and by use of flooding. The latter technique involves sending copies of a packet signal along all possible paths to a desired output, all but one copy failing at arbiters (34) within the switch plane fabric or at a switch plane arbiter (24).

13 Claims, 7 Drawing Sheets

SELF-ROUTING SWITCH ELEMENT FOR AN ASYNCHRONOUS TIME SWITCH

FIELD OF THE INVENTION

This invention relates to a self-routing switching element and to an asynchronous time switch incorporating a switch fabric of such switching elements.

BACKGROUND OF THE INVENTION

The ability to transmit many diverse forms of information (e.g. voice, video, image, graphics, text, computer data, control data, electronic funds, electronic mail, etc.) in an integrated manner, across a general purpose communications network, has long been a requirement. The existing current problem is that most forms of information transfer may be clearly classified into two distinct and mutually opposing categories depending upon the requirements they impose upon the communications network. Signals such as voice and video present a reasonably constant traffic load to the network and can tolerate a relatively high loss and error rate within the network, but exhibit critical delay and delay variance requirements. At the other end of the spectrum the vast majority of examples of data transfer present a highly and rapidly fluctuating traffic demand and are extremely intolerant to errors in transmission, but can tolerate a high and variable delay. Due to the opposing nature of these two classes of traffic, two very different methods of switching have been developed to support their electronic communication; circuit switching and packet switching. Though many attempts have been made, so far these two switching mechanisms have proved very difficult to integrate into a single communications network of commercial significance.

It is an aim of this invention firstly to provide a self-routing switching element for use in a high capacity, fast packet switch operating according to the technique of asynchronous time division, and also to provide such an asynchronous time switch enabled by the incorporation of said switching elements, which has the capability for handling both voice and data traffic by virtue of the use of packet switching, with very small packets, in combination with virtual circuits across the network.

SUMMARY OF THE INVENTION

According to a first aspect of the invention, there is provided a self-routing switching element for use in an asynchronous time switch, comprising a plurality of selectors each having an input for incoming tagged packet signals; a plurality of arbiters each having an output for a transmitted packet signal, and a signal path connection between each selector and each arbiter; each selector being operable to examine the tag of an incoming packet signal and route the packet signal to the arbiter identified by the examined tag, and each arbiter being operable to select the first packet signal received from any of the selectors and transmit said first packet signal to its output, at the same time acting on other selectors to prevent the transmission of subsequent packet signals until the transmission of said first packet signal is completed.

According to a second aspect of the invention, there is provided an asynchronous time switch comprising a plurality of input port controllers each fed from a queue of incoming packet signals in an input buffer, a plurality of output port controllers each feeding an output buffer, and a switch fabric interconnecting the input port controllers and the output port controllers, the switch fabric comprising a plurality of switching elements providing a signal path between each input port controller and each output port controller, wherein each of at least some of the plurality of switching elements is a switching element constructed in the manner hitherto defined in accordance with the first aspect of the invention.

Thus, an essential feature of the self-routing switch in accordance with the invention is that it consists of a plurality of selectors and arbiters with a single connection, which may consist of a number of signal paths between each selector output and each arbiter input. A switching element with any integer number of inputs and outputs, not necessarily equal, may be made, but sizes which are a power of two are preferred for implementation in binary logic. The function of the selector is to examine the tag of the incoming packet and route the packet to the corresponding arbiter. The function of the arbiter is to select the first incident packet and transmit it across the output port, whilst prohibiting the transmission of all further incident packets from other selectors, as by asserting a busy signal, until transmission of the selected packet is complete.

The principles of operation of an asynchronous time switch are known in the art. The input port controllers, the output port controllers, and the switch fabric each work independently, without any requirement for central control, upon the packets which arrive at their inputs. In general, each input port controller will be fed from a queue of incoming packets in an input buffer and each output port controller will feed an output buffer. The structure of the switch fabric is a multi-stage interconnection network constructed from a number of identical switching elements connected in stages. The throughput of the structure may be increased by connecting multiple planes in parallel to offer multiple paths between each input/output pair of controllers. Any integer size of switching element in accordance with the invention may be used to construct an interconnection network, i.e. switch fabric, but if the switching element is to be implemented in binary logic then a size which is a power of two is preferred for reasons of efficiency.

In the basic operation of the switch it is assumed that the input port controller adds a packet tag to the head of each incident or incoming packet. This tag indicates the desired destination of the packet and consists merely of the binary representation of the destination output port number. The value of the tag may be derived from virtual circuit connection information within each packet. The interconnection network, however, is so arranged that in order to forward an incident packet towards the desired destination a switching element merely has to select the digit(s) within the tag, corresponding to the current stage within the network, and forward the packet over the corresponding output.

The implementation of the switching elements may either contain internal buffers, to form a buffered network, or may not, in which case a non-buffered network results. The concensus of current opinion is that a buffered network is preferable as that offers a greater throughput per switching element. However, in the case of the present invention, investigations suggest that it is much more difficult to achieve voice packet priority in a buffered network and that the implementation of a buffered switching element is much more complex than that of a non-buffered design. It is therefore proposed to use a non-buffered switching element in which switch throughput is improved by using switching elements of larger size than is possible for a buffered design.

In a non-buffered implementation in accordance with a further feature of the present invention, each connection consists of a forward channel which carries the packet and a reverse channel which carries a busy signal back towards the input port controller. The input port controller first operates to launch a packet into the switch fabric. If the destination port is busy, or if no free path through the switch fabric is available, the switch fabric returns a busy signal shortly after the input port controller has launched the last bit of the tag into the switch fabric. On receiving a busy signal, the input port controller abandons this attempt at transmitting the packet, removes the attempt from the switch fabric and waits for a short period (typically equivalent to about 10 per cent of the duration of a packet). After this period the input control makes another attempt at transmitting the packet, and so on, until it is successful. A packet transmission is assumed to be successful if no busy signal is received by the end of transmission of the packet.

The foregoing description inherently assumes the use of electronic switching and signal paths. However, as technology progesses, the use of optical switching and signal paths may become more attractive. Specifically, certain components of the selector and the arbiter of each switching element may be implemented in bulk optical devices and interconnected by optical fibre, while the control logic may be implemented electrically, to form an electro-optic switching element. Such an implementation could work at very high data rates.

A conventional solution to enhancing the throughput performance of an interconnection network with a single path between every input/output pair would be to use buffered switching elements. However, this makes the implementation of low delay, voice class traffic priority difficult and limits the size of switching element which can be implemented. In accordance with a further feature of this invention, it is proposed to enhance the throughput of the switch fabric by the use of large size switching elements and by the use of multiple paths through the switch fabric between every input/output controller pair. This requires a mechanism for locating a free path to the destination from the set of all equivalent paths. One possibility is a searching mechanism in which the input port controller attempts to send the packet over each of the equivalent paths in turn, by manipulating the packet tag, until it is successful. An alternative of greater throughput and lower delay is to use a flooding mechanism. In this mechanism multiple copies of the packet are sent simultaneously over all free paths that lead to the required destination. The scheme relies upon the fact that only one copy of the packet will be successful in reaching the destination and all other copies will fail at an arbiter and be removed soon after the input port controller has completed transmission of the packet tag.

Thus, in accordance with a third aspect of the invention, there is provided an asynchronous time switch comprising a plurality of inputs and a plurality of outputs connectable by means of a plurality of switching elements as to define a plurality of signal paths between each input and each output; input control means operable to send copies of a packet signal substantially simultaneously along all signal paths between a given input and a given output and output control means operable to detect a single copy of the packet signal received at the output and to suppress the transmission of subsequent copies along other signal paths.

Again, in the foregoing description of switch operation, a single class of packet traffic has been assumed. It is a further object of this invention to provide a switch capable of handling both voice class and data class traffic with a capacity and characteristics relevant to commercial exploitation. To achieve this it is necessary to distinguish between voice class traffic and data class traffic so that voice class traffic may be given priority due to its stringent low delay requirement.

In accordance with a fourth aspect of the present invention, there is provided an asynchronous time switch having input signal means operable to distinguish between voice class tagged packet signals and data class tagged packet signals and to transmit data class packet signals only when all voice class packet signals have been transmitted.

BRIEF DESCRIPTION OF DRAWINGS

A switching element and synchronous time switch in accordance with the invention will now be exemplified with reference to the accompanying drawings, in which.

DETAILED DESCRIPTION OF PREFERRED EMBODIMENTS

Asynchronous Time Switch

Figure 1:
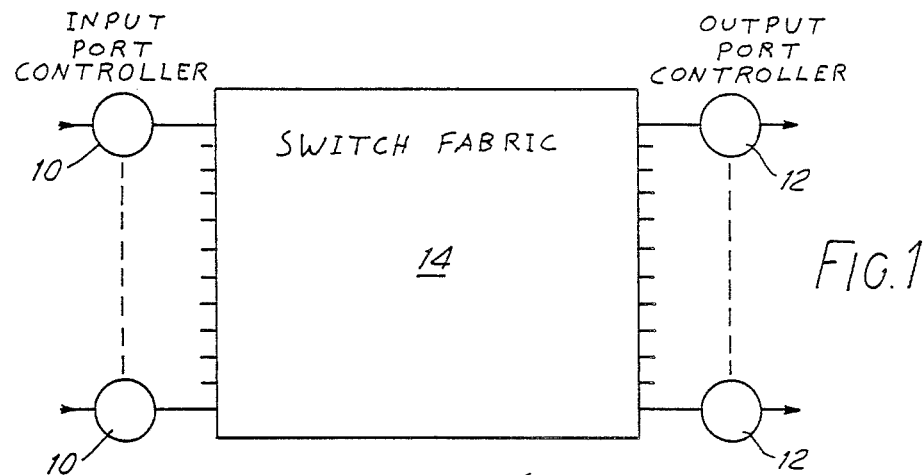
FIG. 1 shows one example of an asynchronous time switch generally in accordance with the prior art.

The overall structure of an asynchronous time switch is given in FIG. 1. The input port controllers 10, the output port controllers 12, and the switch fabric 14 each work independently, without any requirement for central control, upon the packets which arrive at their inputs. In general each input port controller is fed from a queue of incoming packets in an input buffer (not shown) and each output port controller feeds an output buffer (not shown). The structure of the switch fabric is a multi-stage interconnection network constructed from a number of identical switching elements connected in stages. Many examples of such networks are known from the prior art.

Figure 2:
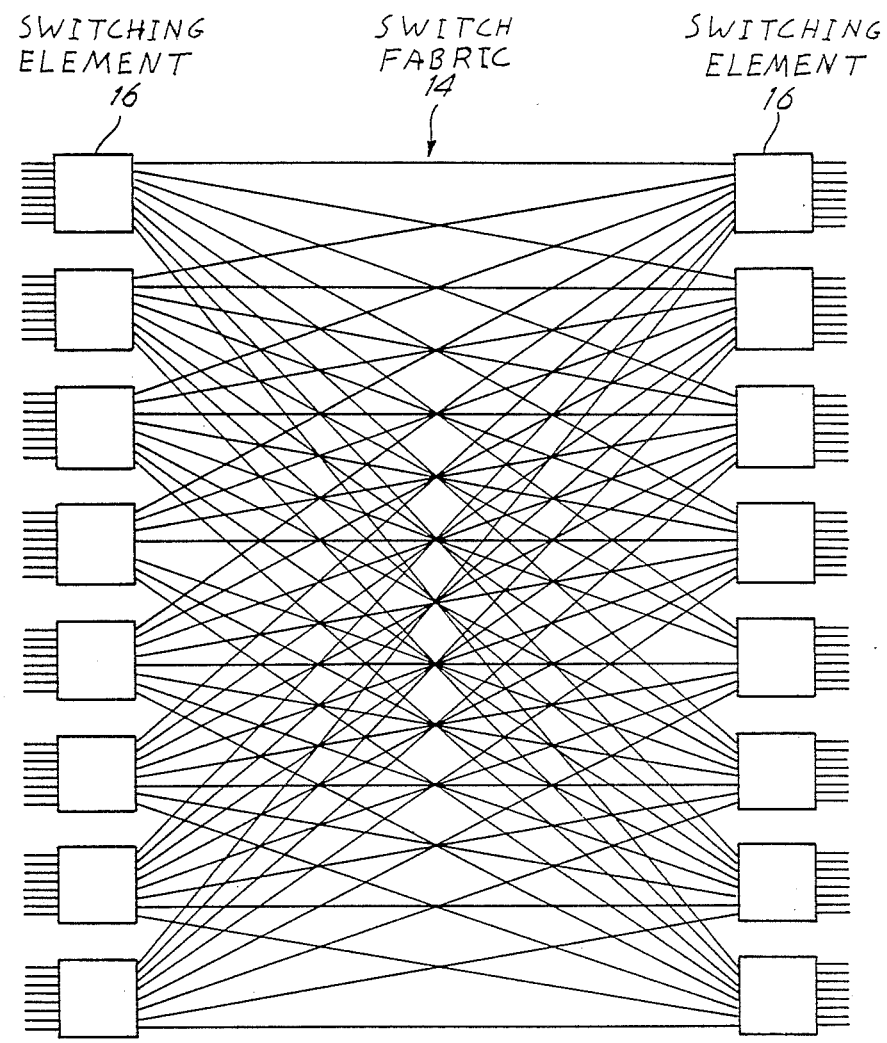
FIGS. 2 and 3 respectively show two examples of switch fabric which, in accordance with known practice, may be employed in an asynchronous time switch.
Figure 3:
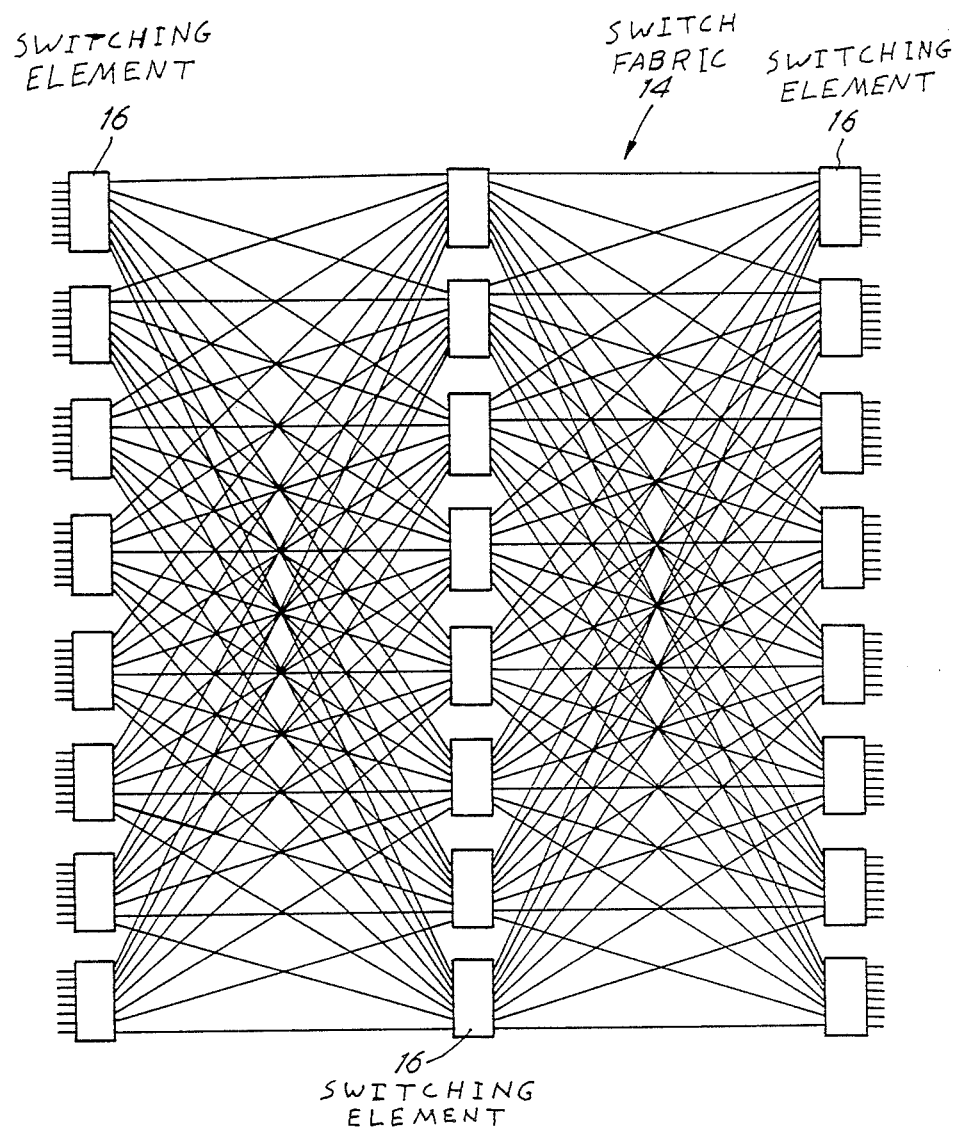

Two specific examples are given in FIGS. 2 and 3, in which a 64×64 port switch is constructed from 8×8 switching elements (SE) 16. The difference between the two examples is that FIG. 2 has only a single path between each input and output pair whereas FIG. 3 offers eight alternative paths and therefore supports a higher throughput.

Figure 4:
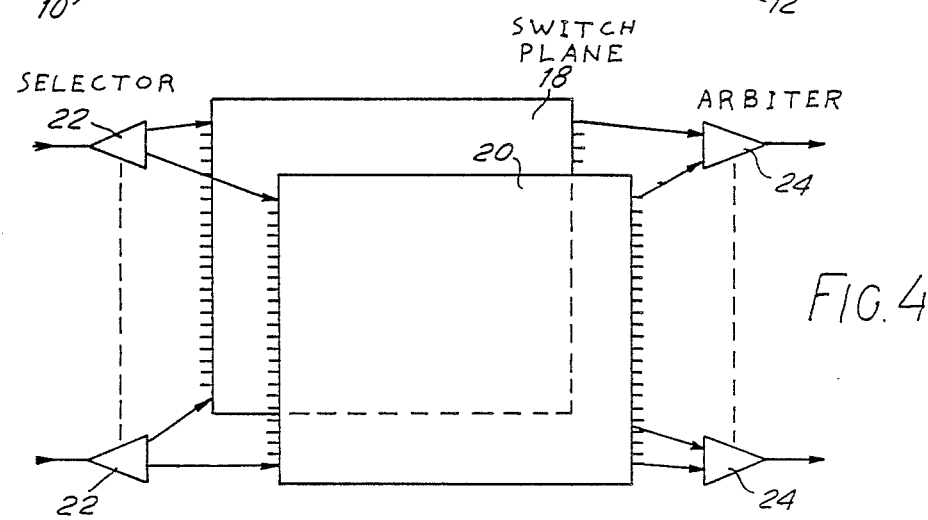
FIG. 4 diagrammatically illustrates a multi-plane switch fabric.

The throughput of the structure illustrated in FIG. 2 may be increased by connecting multiple planes in parallel, as shown in FIG. 4, in two switch planes 18,20, each such as that of FIG. 2, are connected in parallel to offer multiple paths between each input/output pair. Switch plane selectors 22 and switch plane arbiters 24 are also indicated in FIG. 4. Any integer size of switching element 16 may be used to construct an interconnection network, i.e. switch fabric, but if the switching element is to be implemented in binary logic then a size which is a power of two is preferred for reasons of efficiency.

In the basic operation of the switch it is assumed that all incident packets have a packet header which contains a tag. This tag indicates the desired destination of the packet and consists merely of the binary representation of the destination output port number. The interconnection network, however, is so arranged that in order to forward an incident packet towards the desired destination a switching element 16 merely has to select the digit(s) within the tag, corresponding to the current stage within the network, and forward the packet over the corresponding output.

The preferred embodiment implementation of the switching element is non-buffered, wherein switch throughput is improved by using the switching elements of larger size than is possible for a buffered design.

In this non-buffered implementation of switch fabric, each connection between switching elements consists of two channels, a forward channel which carries the packet and a reverse channel which carries a busy signal back towards the input port controller.

The Switching Element

Figure 5:
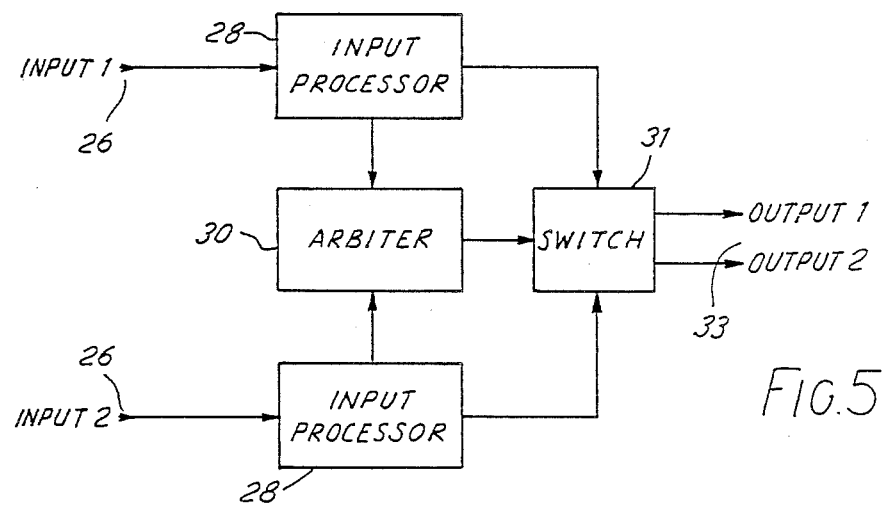
FIG. 5 shows a conventional design of switching element for the switch fabric of an asynchronous time switch.

FIG. 5 depicts the conventional approach to the design of a switching element for the switch fabric of an asynchronous time switch. Each input 26 feeds into an input processor 28 which informs a central arbiter of incoming requests. The arbiter 30 makes a decision as to whether an incoming request may be granted or not, depending upon the total state of the switching element, operates the switch 31 feeding outputs 33, and sets the switch path and busy signals accordingly. This design is feasible for switches of size 2×2, as illustrated, but for larger switch sizes the arbitration function becomes unacceptably complex. The speed of operation for large size switching elements is also limited by the centralised arbitration function.

Figure 6:
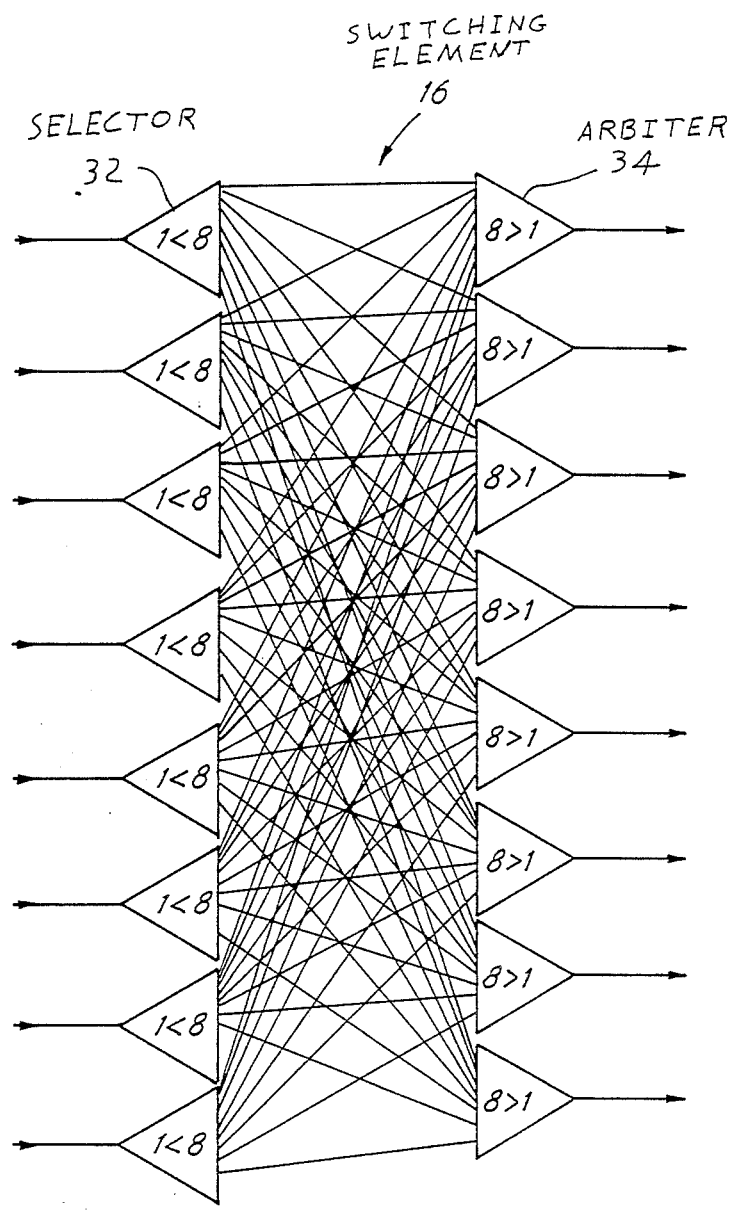
FIG. 6 shows a self-routing switching element in accordance with the present invention.

FIG. 6 illustrates an internal construction of an 8×8 switching element in accordance with the invention. The switching element 16 consists of a plurality of selectors 32 and arbiters 34 with a single connection between each selector output and each arbiter input. A switching element 16 with any integer number of inputs and outputs, not necessarily equal, may be constructed, but sizes which are a power of two are preferred for implementation in binary logic. The function of the selector is to examine the tag of the incoming packet and route the packet to the corresponding arbiter. The function of the arbiter is to select the first incident packet and transmit it across the output port, whilst preventing the transmission of all further incident packets from other selectors by asserting the busy signal, until transmission of the selected packet is complete.

Figure 7:
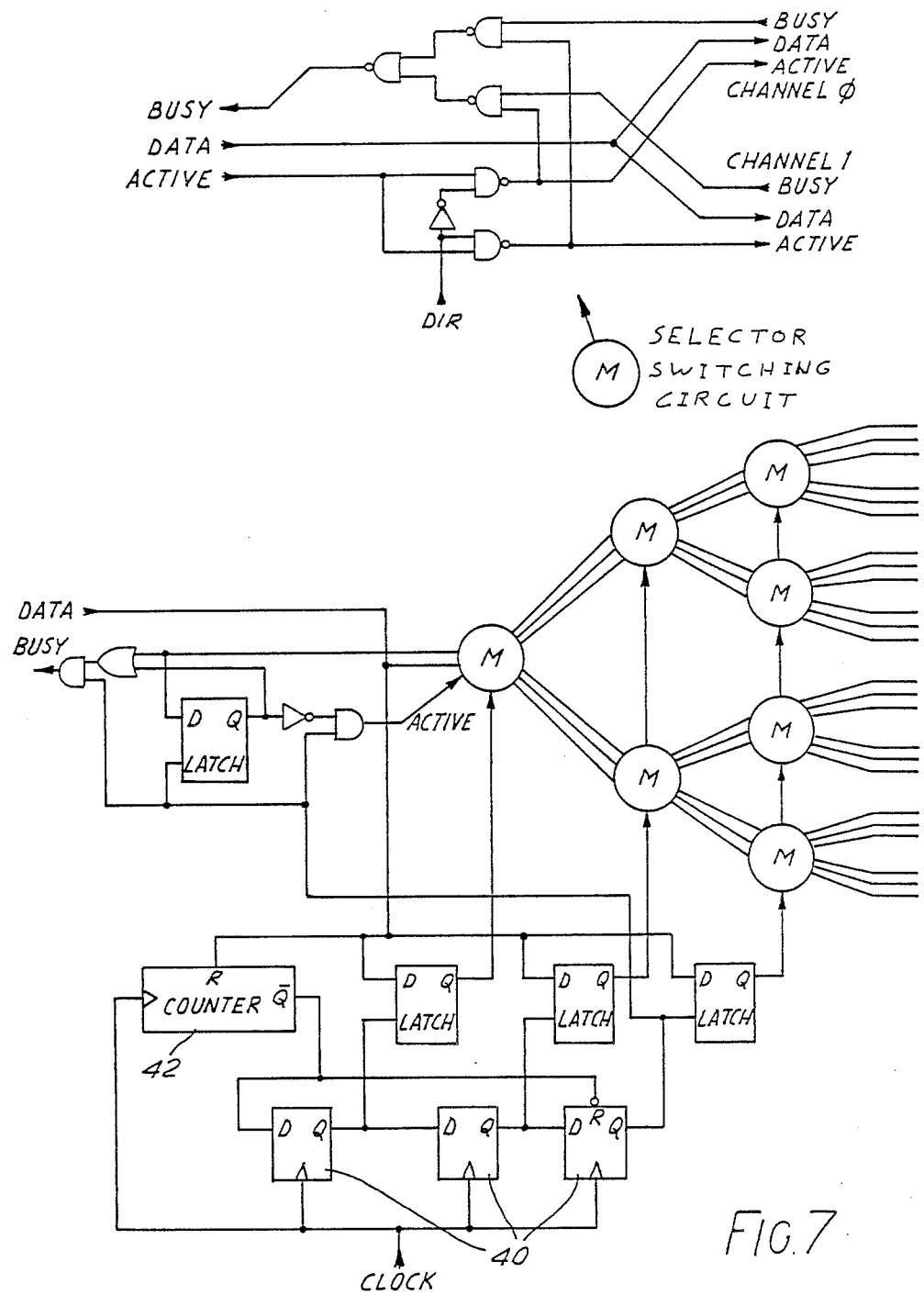
FIGS. 7 and 8 respectively show exemplary arrangements of selector and arbiter for use in switching element in accordance with the invention.
Figure 8:
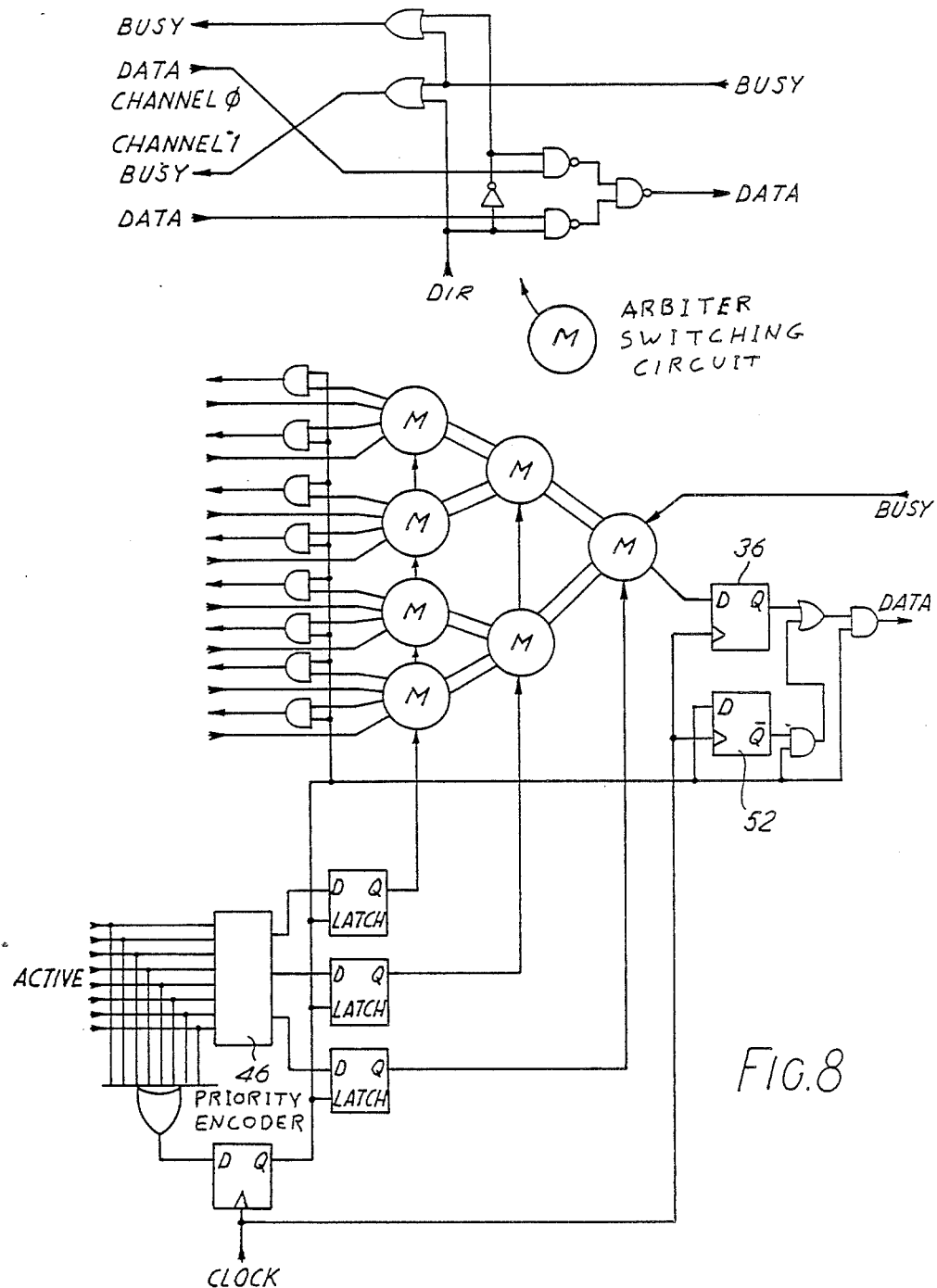

As an example, the logic diagrams of a single 8-way selector and corresponding arbiter are given in FIGS. 7 and 8, respectively. In this design an input line is deemed to be idle after a sequence of eight zeros; thus the packet is bit stuffed by the input port controller to ensure that the maximum number of consecutive zeros is seven and a start of packet (SOP) bit is added to the front of the tag. The SOP bit and the first n tag bits are removed from the packet by each selector (where the size of the switching element is $2^n$) whereas each arbiter replaces the SOP bit. As soon as the tag has been fully received by the selector the destination is known. At this point a decision is made by the selector as to whether the selected arbiter is busy or not. If busy the packet is dropped and a busy signal is returned. If the arbiter is free then the packet set up progresses. The switching circuit, shown in full at the top of each Figure, in replicated within each of the units labelled 'M', for the selector, and 'm', for the arbiter.

In the selector of FIG. 7, the three latches 38 latch the tag. The counter 42 monitors activity on the data path looking for the idle condition. When it counts eight consecutive zeros on the input line it resets the selector. The 'active' output signals of each selector feed the 'active' input lines of each arbiter in the manner indicated in FIG. 6; however, each connection in FIG. 6 corresponds to three actual paths in this implementation. The two forward paths carry signals to indicate the presence of valid data and the data itself, while the reverse path carries the busy signal.

In the arbiter of FIG. 8, the eight 'active' signal lines, one from each of the eight selectors, are each fed to a priority encoder 46 arranged so that the first active signal to be detected by latches 78 and encoded to set up the switching circuits 'm'. The D-type 36 in the data path provides delay to ease timing constraints, and the other D-type 52 replaces the SOP bit. The arbiter clears down when the active input drops to the inactive state.

In FIGS. 7 and 8, it is possible for the switching circuits marked 'M' and 'm', each arranged in the manner shown at the top of the respective Figures, to be implemented as bulk optical devices interconnected by optical fibre.

Flooding Mechanism

Throughput performance of the interconnection network is increased by use of a flooding mechanism. In this mechanism multiple copies of the packet are sent simultaneously over all free paths that lead to the required destination. The scheme relies upon the fact that only one copy of the packet will be successful in reaching the destination and all other copies will fail at an arbiter and be removed soon after the input port controller has completed transmission of the packet tag.

Figure 9:
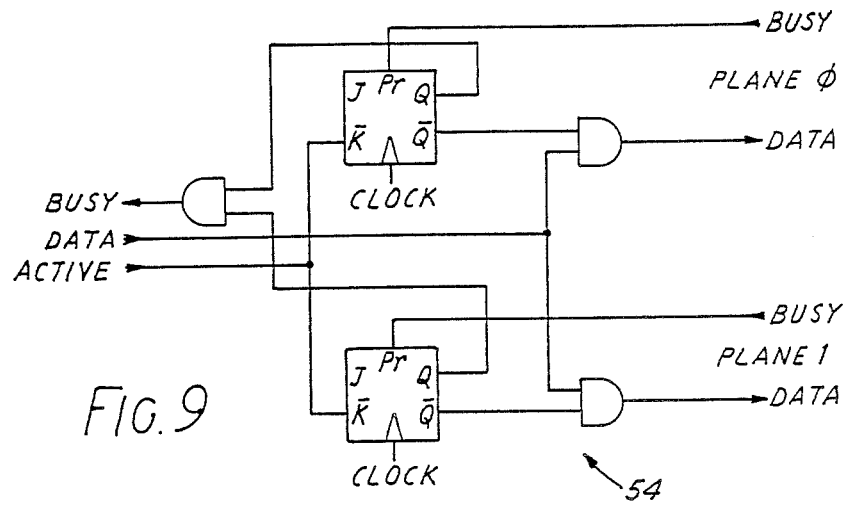
FIG. 9 illustrates a flooding switch plane selector for a multi-plane switch fabric.

FIG. 4 illustrates a two-plane structure, for which the corresponding implementation of a flooding switch plane selector is given in FIG. 9. In the flooding selector 54 an incoming packet is transmitted transparently to both switch planes but is removed from a switch plane as soon as the respective busy signal is received. Should both busy signals become asserted then no free path to the destination is available, thus the unit returns a busy signal to the input port controller. A flooding selector of any integer dimension may be constructed by replication of the basic circuit illustrated. The switch plane arbiter of FIG. 4 is used to select one of the multiple copies of the packet contending for the output, and may be similar in design to the arbiter of the switching element given in FIG. 8, except for its dimension.

A multiple path interconnection network such as that of FIG. 3 requires an entire first stage composed of flooding switching elements. A flooding switching element may be constructed in exactly the same manner as that of the switching element illustrated in FIG. 6, but using flooding selectors instead of ordinary selectors.

One further special purpose switching element may be constructed by the use of specialised selectors within the switching element structure of FIG. 6. If a selector is designed which selects any one of the free outputs for an incoming packet, without reference to the packet tag, then a switching element may be produced which routes an incoming packet to any free output port from a group of equivalent ports. Such a device is of use, for example, in grouping together trunks going to the same remote destination.

Voice Protocol

Figure 10:
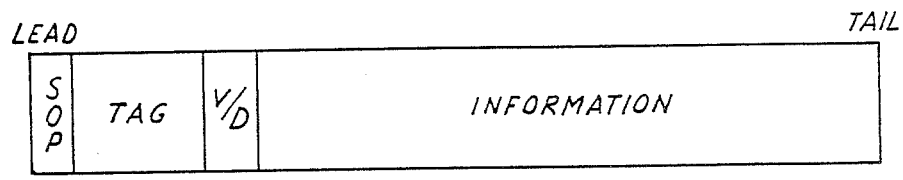
FIG. 10 shows the format of a packet signal for a switch adapted to handle both voice class and data class traffic.

Referring back to FIG. 1, for the handling of both voice class and data class traffic, no change is required in the implementation of the switching elements of the switch fabric but modification of the operation of both the input and output port controllers is necessary. The packet queue at the input to every input port controller is replaced by two queues, one for voice class packets and the other for data. In addition, packets are distinguished by means of a voice/data bit immediately following the tag at the head of the packet. The resulting packet format is shown in FIG. 10. A multi-plane structure for the switch fabric, such as that of FIG. 4, is also employed.

The input port controller always takes incoming packets from the voice class packet queue until that queue is empty, at which point it will take packets from the data queue. If it is attempting to transmit a data class packet, but has so far failed to succeed, and a voice class packet arrives, it will serve the voice class packet first and return to the data class packet when the voice class queue is empty. If, however, it was serving a successful data class packet when the voice class packet arrived it will complete the transmission of the data class packet before serving the voice class packet. This guarantees voice class priority at the input ports but it is also necessary to guarantee voice packet priority at the output ports.

If an output port is busy serving a packet of either class, and several packets of both voice and data classes, from different input ports, are competing for access to the active output port, then it is necessary to ensure that when the output port becomes free it serves a voice packet next. It is therefore required to ensure voice class priority within a single input port and also across all input ports competing for the same output port.

Figure 11:
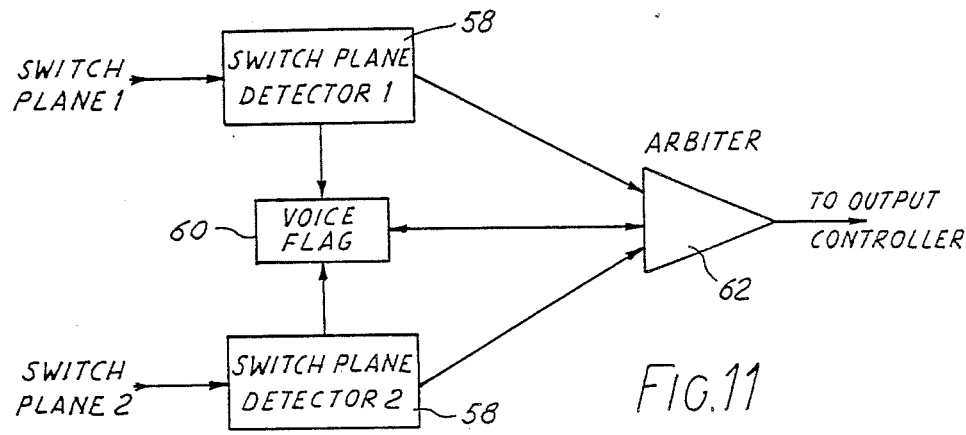
FIG. 11 shows a switch plane arbiter for use in a switch giving priority to voice class traffic.

Voice class priority at the output port is achieved by using the multi-plane switch structure given in FIG. 4 with the switch plane arbiter 24 of FIG. 11. The first packet to arrive at an idle output port will be accepted regardless of its class, i.e. voice or data, but will only occupy one of the switch planes while it is being received. Subsequent attempts, by other input port controllers, to transmit over a busy output port will therefore be detected by the switch plane output detector 58 of the idle switch plane. This circuit 58 inspects the voice/data bit of the incoming packet, before asserting the busy signal, and if the incident packet is a voice class packet sets the voice class flag 60 of the output port arbiter 62. If the voice class flag is set, the output port arbiter 62 will only accept a voice class packet when it returns to the idle state. The act of accepting a voice class packet will clear the voice flag. In this manner voice packets are guaranteed priority over data packets at the output port.

An alternative approach is to construct a switch plane arbiter 24 that can accept two packets arriving at the same time and store them in an output buffer. In this case, voice packets are granted priority by permitting the switch plane arbiter to accept up to two voice packets being transmitted at any time but only ever accepting a single data packet at any time.

It will be appreciated that the above-described and illustrated examplary embodiments may be modified in various ways within the scope of the invention hereinbefore defined.

I claim:

1. A self-routing switching element for use in an asynchronous time switch, comprising:
   a plurality of selectors each having an input for incoming tagged packet signals;
   a plurality of arbiters each having an output for a transmitted packet signal; and
   a signal path connection between each of said plurality of selectors and each of said plurality of arbiters;
   wherein each of said plurality of selectors is operable to examine the tag of an incoming tagged packet signal and route said incoming tagged packet signal to one of said plurality of arbiters identified by said examined tag, and wherein each of said plurality of arbiters is operable to select a first packet signal received from any of said plurality of selectors and transmit said first packet signal to its output, and to act on other ones of said plurality of selectors to prevent subsequent incoming tagged packet signals from being transmitted until said first packet signal is transmitted.

2. The invention set forth in claim 1 wherein each of said plurality of selectors is operable to generate an active signal in response to the presence of a valid incoming tagged packet signal at its input; said one of said plurality of arbiters acting on those of said plurality of selectors at which an active signal is detected to prevent subsequent incoming tagged packet signals from being transmitted until said first packet signal is transmitted.

3. The invention set forth in claim 2 wherein each of said plurality of arbiters includes priority selection means for selecting a first active signal from one of said plurality of selectors and transmitting the packet signal from said one of said plurality of selectors.

4. The invention set forth in claim 2 wherein said signal path connection includes a data signal path for transmission of packet signals and an active signal path for transmission of an active signal detected by said one of said plurality of arbiters.

5. The invention set forth in claim 1 wherein the one of said plurality of arbiters receiving said first packet signal generates a busy signal which is passed back to said plurality of selectors to inhibit transmission of subsequent incoming tagged packet signals.

6. The invention set forth in claim 5 wherein said signal path connection includes a busy signal path for transmission of said busy signal from said one of said plurality of arbiters to said plurality of selectors.

7. An asynchronous time switch comprising:
   a plurality of input port controllers;

an input buffer containing a queue of incoming packet signals from which each of said plurality of input port controllers is fed;

a plurality of output port controllers;

an output buffer fed by each of said plurality of output port controllers; and a switch fabric interconnecting said plurality of input port controllers and said plurality of output port controllers, wherein said switch fabric comprises a plurality of switching elements providing a signal path connection between each of said plurality of input port controllers and each of said plurality of output port controllers and wherein said switch fabric includes.

a plurality of selectors each having an input from one of said input port controllers for receiving incoming packet signals having tags;

a plurality of arbiters each having an output to one of said output port controllers for transmitting packet signals having tags;

a signal path connection between each of said plurality of selectors and each of said plurality of arbiters;

each of said plurality of selectors operable to examine tags to route said incoming tagged packet signals to said plurality of arbiters as transmitted tagged packet signals.

8. The invention set forth in claim 7 wherein a plurality of signal paths is provided between each of said plurality of input port controllers and each of said plurality of output port controllers.

9. An asynchronous time switch comprising:

a plurality of inputs;

a plurality of outputs;

a plurality of switching elements operable to connect said plurality of inputs and said plurality of outputs so as to define a plurality of signal paths between each of said plurality of inputs and each of said plurality of outputs;

input control means operable to transmit copies of a packet signal substantially simultaneously along all of said plurality of signal paths between one of said plurality of inputs and one of said plurality of outputs; and output control means operable to detect a single copy of said packet signal received at one of said plurality of outputs from one of said plurality of signal paths and to prevent subsequent copies of said packet signal from being transmitted along others of said plurality of signal paths.

10. The invention set forth in claim 9 wherein at least some of said plurality of switching elements are self-routing switching elements.

11. An asynchronous time switch operable to transmit tagged packet signals carrying voice class information and tagged packet signals carrying data class information comprising:

a plurality of inputs;

a plurality of outputs;

a plurality of switching elements having a plurality of signal paths between each of said plurality of inputs and each of said plurality of outputs;

input control means operable to distinguish whether an incoming one of said tagged packet signals to be transmitted is carrying voice class information or data class information;

wherein said input control means is further operable to transmit said tagged packet signals carrying data class information over one or more signal paths only when all said tagged packet signals carrying voice class information have been transmitted.

12. The invention set forth in claim 11 wherein said input control means is further operable to modify the tag of said incoming one of said tagged packet signals to be transmitted whereby said modified tag identifies whether said incoming one of said tagged packet signals is carrying voice class information or data class information.

13. The invention set forth in claim 11 having output control means operable to detect said tagged packet signals carrying voice class information and to prevent transmission of all said tagged packet signals carrying data class information when one of said tagged packet signals carrying voice class information has been detected until said detected tagged packet signal carrying voice class information has been transmitted.

* * * * *

UNITED STATES PATENT AND TRADEMARK OFFICE
CERTIFICATE OF CORRECTION

PATENT NO. : 4,965,788

DATED : October 23, 1990

INVENTOR(S) : Peter Newman

It is certified that error appears in the above-identified patent and that said Letters Patent is hereby corrected as shown below:

Column 6, lines 19-20, "Figure, in replicat-ed" should be --Figure, is replicated--.

Column 6, line 36, after "detected", by latches 78" should be --is latched in latches 78--.

Signed and Sealed this

Eleventh Day of January, 1994

Attest:

BRUCE LEHMAN

*Attesting Officer*   *Commissioner of Patents and Trademarks*